(12) United States Patent
Pugh et al.

(10) Patent No.: US 9,180,636 B2
(45) Date of Patent: *Nov. 10, 2015

(54) VARIABLE FOCUS OPHTHALMIC DEVICE

(71) Applicant: Johnson & Johnson Vision Care, Inc., Jacksonville, FL (US)

(72) Inventors: Randall B. Pugh, Jacksonville, FL (US); Daniel B. Otts, Fruit Cove, FL (US); Frederick A. Flitsch, New Windsor, NY (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,739

(22) Filed: Jan. 7, 2013

(65) Prior Publication Data

US 2013/0122132 A1     May 16, 2013

Related U.S. Application Data

(62) Division of application No. 12/916,797, filed on Nov. 1, 2010, now abandoned, which is a division of application No. 12/567,049, filed on Sep. 25, 2009, now Pat. No. 8,348,424.

(60) Provisional application No. 61/101,479, filed on Sep. 30, 2008.

(51) Int. Cl.
  *B29D 11/00* (2006.01)
  *G02C 7/08* (2006.01)
  *G02C 7/04* (2006.01)

(52) U.S. Cl.
  CPC .... *B29D 11/00951* (2013.01); *B29D 11/00009* (2013.01); *B29D 11/00826* (2013.01); *G02C 7/04* (2013.01); *G02C 7/085* (2013.01); *B29D 11/00961* (2013.01)

(58) Field of Classification Search
  CPC ............... B29D 11/00403; B29D 11/00413; B29D 11/0048; B29D 11/00826; B29D 11/00961; B29D 11/00951; B29D 11/00009; G02C 7/04; G02C 7/085
  USPC .............. 425/139, 150, 174.4, 345, 395, 414, 425/423, 466–470, 808; 249/63, 122, 157; 264/1.32, 1.36, 1.38; 351/159, 160 R, 351/177
  See application file for complete search history.

(56) References Cited

U.S. PATENT DOCUMENTS

| 4,873,029 A | 10/1989 | Blum et al. |
| 5,171,266 A | 12/1992 | Wiley |

(Continued)

FOREIGN PATENT DOCUMENTS

| CN | 1675575 A | 8/2005 |
| EP | 1818692 A2 | 8/2007 |

(Continued)

OTHER PUBLICATIONS

PCT International Search Report, dated Jan. 21, 2010, for PCT Int'l. Appln. No. PCT/US2009/058589.

*Primary Examiner* — Yogendra Gupta
*Assistant Examiner* — Emmanuel S Luk

(57) ABSTRACT

This invention discloses methods and apparatus for providing a variable optic insert into an ophthalmic lens. An energy source is capable of powering the variable optic insert included within the ophthalmic lens. In some embodiments, an ophthalmic lens is cast molded from a silicone hydrogel.

15 Claims, 8 Drawing Sheets

(56) References Cited

U.S. PATENT DOCUMENTS

| | | | |
|---|---|---|---|
| 5,712,721 A | 1/1998 | Large | |
| 6,033,518 A | 3/2000 | Backfisch | |
| 6,071,440 A * | 6/2000 | Wang et al. | 264/1.1 |
| 6,139,146 A | 10/2000 | Zhang | |
| 6,834,955 B2 | 12/2004 | Doshi | |
| 6,986,579 B2 * | 1/2006 | Blum et al. | 351/159.39 |
| 7,101,043 B2 | 9/2006 | Kumar et al. | |
| 7,311,398 B2 | 12/2007 | Kuiper et al. | |
| 7,423,801 B2 | 9/2008 | Kaufman et al. | |
| 7,612,948 B2 * | 11/2009 | Immink et al. | 359/666 |
| 7,833,207 B2 | 11/2010 | Kenmochi et al. | |
| 7,931,832 B2 * | 4/2011 | Pugh et al. | 264/1.32 |
| 8,080,187 B2 * | 12/2011 | Tepedino et al. | 264/1.32 |
| 8,348,424 B2 * | 1/2013 | Pugh et al. | 351/159.74 |
| 8,534,831 B2 * | 9/2013 | Tepedino et al. | 351/159.02 |
| 2004/0051190 A1 * | 3/2004 | Slack et al. | 264/2.5 |
| 2004/0075809 A1 | 4/2004 | Wildsmith | |
| 2005/0099594 A1 * | 5/2005 | Blum et al. | 351/160 R |
| 2005/0280769 A1 | 12/2005 | Cano | |
| 2006/0072070 A1 * | 4/2006 | Kuiper et al. | 351/177 |
| 2006/0126698 A1 * | 6/2006 | Blum et al. | 372/101 |
| 2006/0186564 A1 * | 8/2006 | Adams et al. | 264/1.32 |
| 2007/0153232 A1 | 7/2007 | Warden | |
| 2007/0153405 A1 | 7/2007 | Kuiper et al. | |
| 2007/0195265 A1 | 8/2007 | Dreher | |
| 2007/0274626 A1 * | 11/2007 | Sabeta | 385/24 |
| 2008/0208335 A1 | 8/2008 | Blum et al. | |
| 2009/0206498 A1 * | 8/2009 | Tepedino et al. | 264/1.36 |
| 2009/0243125 A1 * | 10/2009 | Pugh et al. | 264/1.36 |
| 2009/0244477 A1 * | 10/2009 | Pugh et al. | 351/158 |
| 2010/0072643 A1 * | 3/2010 | Pugh et al. | 264/2.7 |
| 2010/0076553 A1 | 3/2010 | Pugh | |
| 2010/0078837 A1 * | 4/2010 | Pugh et al. | 264/1.38 |
| 2010/0078838 A1 * | 4/2010 | Pugh et al. | 264/1.38 |
| 2010/0079724 A1 * | 4/2010 | Pugh et al. | 351/177 |
| 2010/0109175 A1 * | 5/2010 | Pugh et al. | 264/1.36 |
| 2010/0110372 A1 * | 5/2010 | Pugh et al. | 351/177 |
| 2011/0045112 A1 * | 2/2011 | Pugh et al. | 425/126.1 |
| 2011/0157544 A1 * | 6/2011 | Pugh et al. | 351/158 |
| 2012/0199995 A1 * | 8/2012 | Pugh et al. | 264/1.36 |
| 2013/0242254 A1 * | 9/2013 | Tepedino et al. | 351/159.01 |

FOREIGN PATENT DOCUMENTS

| | | |
|---|---|---|
| EP | 1897668 A1 | 3/2008 |
| JP | 1-286809 | 10/1995 |
| JP | 8-508826 | 9/1996 |
| JP | 2005-535942 | 11/2005 |
| JP | 2007-526517 | 9/2007 |
| JP | 2010-517081 | 5/2010 |
| WO | WO 9423334 A1 | 10/1994 |
| WO | WO 03077012 A2 | 9/2003 |
| WO | WO 03090611 A1 | 11/2003 |
| WO | WO 03077012 A3 | 1/2004 |
| WO | WO 2004015460 | 2/2004 |
| WO | WO 2004015460 A | 2/2004 |
| WO | WO 2004015460 A3 | 2/2004 |
| WO | WO 03077012 A8 | 3/2004 |
| WO | WO 2004019078 A2 | 3/2004 |
| WO | WO 2004019078 A3 | 5/2004 |
| WO | WO 2004049927 A1 | 6/2004 |
| WO | WO 2005088388 A1 | 9/2005 |
| WO | WO 2006015315 A2 | 2/2006 |
| WO | WO 2006092804 A2 | 9/2006 |
| WO | WO 2006015315 A3 | 4/2007 |
| WO | WO 2008091859 A1 | 7/2008 |

* cited by examiner

VARIABLE FOCUS OPHTHALMIC DEVICE

CROSS REFERENCE TO RELATED APPLICATIONS

The present application is a divisional of U.S. patent application Ser. No. 12/916,797, filed Nov. 1, 2010; which claims priority to U.S. patent application Ser. No. 12/567,049; filed Sep. 25, 2009 (now U.S. Pat. No. 8,348,424); which claims priority to Provisional Application Ser. No. 61/101,479 filed Sep. 30, 2008; the contents of which are relied upon and incorporated by reference.

FIELD OF USE

This invention describes an ophthalmic device a variable focus and, more specifically, in some embodiments, the fabrication of an ophthalmic lens with variable focus insert.

BACKGROUND

Traditionally an ophthalmic lens, such as a contact lens or an intraocular lens provided a predetermined optical quality. A contact lens, for example, can provide one or more of: vision correcting functionality; cosmetic enhancement; and therapeutic effects, but only a set of vision correction functions. Each function is provided by a physical characteristic of the lens. Basically a design incorporating a refractive quality into a lens provides vision corrective functionality. A pigment incorporated into the lens can provide a cosmetic enhancement. An active agent incorporated into a lens can provide a therapeutic functionality.

To date optical quality in an ophthalmic lens has been designed into the physical characteristic of the lens. Generally, an optical design has been determined and then imparted into the lens during fabrication of the lens, such as, for example through cast molding, or lathing. The optical qualities of the lens have remained static once the lens has been formed. However, wearers may at times find it beneficial to have more than one focal power available to them in order to provide sight accommodation. Unlike spectacle wearers, who can change spectacles to change an optical correction, contact wearers or those with intraocular lenses have not been able to change the optical characteristics of their vision correction without significant effort.

SUMMARY

Accordingly, the present invention includes an ophthalmic lens with a variable optic portion, which is capable of changing the optical quality of the lens. In addition, methods and apparatus for forming an ophthalmic lens, with variable optic portion are presented. Some embodiments can also include a cast molded silicone hydrogel contact lens with a rigid or formable energized insert, which additionally includes a variable optic, wherein the insert is included within the ophthalmic lens in a biocompatible fashion.

The present invention therefore includes disclosure of an ophthalmic lens with a variable optic portion, apparatus for forming an ophthalmic lens with a variable optic portion and methods for manufacturing the same. An energy source can be deposited onto a media insert and the insert can be placed in proximity to one, or both of, a first mold part and a second mold part. A reactive monomer mix is placed between the first mold part and the second mold part. The first mold part is positioned proximate to the second mold part thereby forming a lens cavity with the energized media insert and at least some of the reactive monomer mix in the lens cavity; the reactive monomer mix is exposed to actinic radiation to form an ophthalmic lens. Lenses are formed via the control of actinic radiation to which the reactive monomer mixture is exposed.

DETAILED DESCRIPTION OF THE INVENTION

Figure 1:
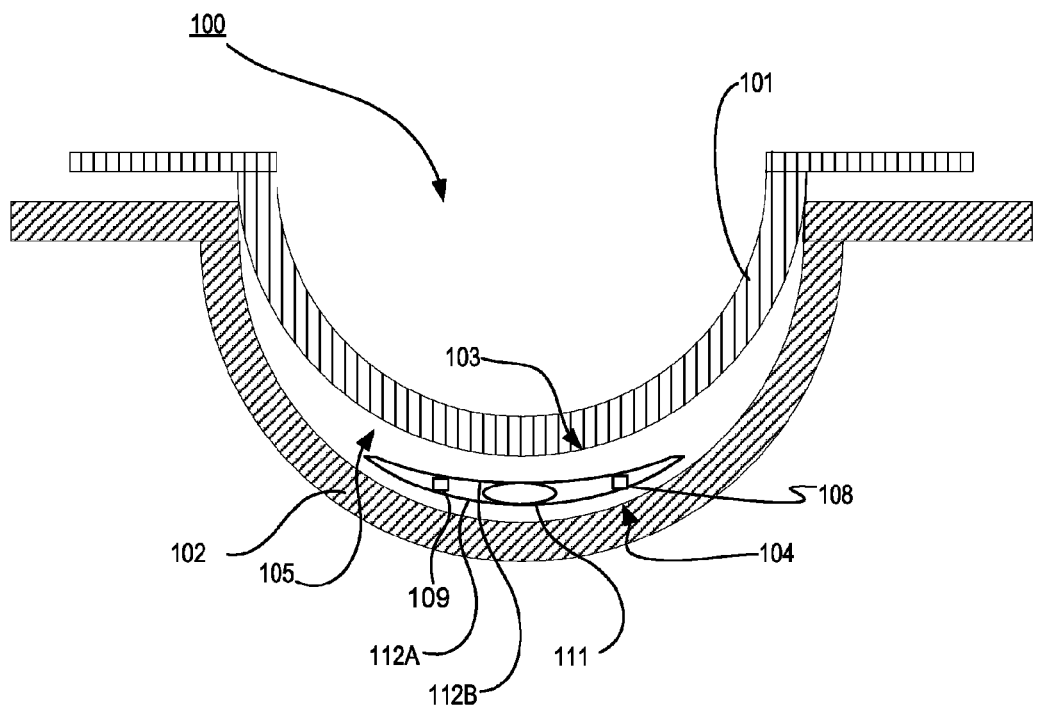
FIG. 1 illustrates a mold assembly apparatus according to some embodiments of the present invention.

The present invention includes methods and apparatus for manufacturing an ophthalmic lens with a variable optic portion. In addition, the present invention includes an ophthalmic lens with a variable optic portion incorporated into the ophthalmic lens.

In the following sections detailed descriptions of embodiments of the invention will be given. The description of both preferred and alternative embodiments are exemplary embodiments only, and it is understood that to those skilled in the art that variations, modifications and alterations may be apparent. It is therefore to be understood that said exemplary embodiments do not limit the scope of the underlying invention.

GLOSSARY

In this description and claims directed to the presented invention, various terms may be used for which the following definitions will apply:

Energized: as used herein refers to the state of being able to supply electrical current to or to have electrical energy stored within.

Energy: as used herein refers to the capacity of a physical system to do work. Many uses within this invention may relate to the said capacity being able to perform electrical actions in doing work.

Energy Source: as used herein refers to device capable of supplying Energy or placing a biomedical device in an Energized state.

Energy Harvesters: as used herein refers to device capable of extracting energy from the environment and convert it to electrical energy.

Lens: refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision. In some embodiments, the preferred lenses of the invention are soft contact lenses are made from silicone elastomers or hydrogels, which include but are not limited to silicone hydrogels, and fluorohydrogels.

Lens forming mixture or "Reactive Mixture" or "RMM" (reactive monomer mixture): as used herein refers to a monomer or prepolymer material which can be cured and crosslinked or crosslinked to form an ophthalmic lens. Various embodiments can include lens forming mixtures with one or more additives such as: UV blockers, tints, photoinitiators or catalysts, and other additives one might desire in an ophthalmic lenses such as, contact or intraocular lenses.

Lens Forming Surface: refers to a surface that is used to mold a lens. In some embodiments, any such surface 103-104 can have an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

Lithium Ion Cell: refers to an electrochemical cell where Lithium ions move through the cell to generate electrical energy. This electrochemical cell, typically called a battery, may be reenergized or recharged in its typical forms.

Media Insert: as used herein refers to a formable or rigid substrate capable of supporting an Energy Source within an ophthalmic lens. In some embodiments, the Media Insert also includes one or more variable optic lenses.

Mold: refers to a rigid or semi-rigid object that may be used to form lenses from uncured formulations. Some preferred molds include two mold parts forming a front curve mold part and a back curve mold part.

Optical Zone: as used herein refers to an area of an ophthalmic lens through which a wearer of the ophthalmic lens sees.

Power: as used herein refers to work done or energy transferred per unit of time.

Rechargeable or Re-energizable: as used herein refers to a capability of being restored to a state with higher capacity to do work. Many uses within this invention may relate to the capability of being restored with the ability to flow electrical current at a certain rate for a certain, reestablished time period.

Reenergize or Recharge: as used herein refers to the restoration of an Energy Source to a state with higher capacity to do work. Many uses within this invention may relate to restoring a device to the capability to flow electrical current at a certain rate for a certain, reestablished time period.

Released from a mold: means that a lens is either completely separated from the mold, or is only loosely attached so that it can be removed with mild agitation or pushed off with a swab.

Variable Optic: as used herein refers to the capacity to change an optical quality, such as for example the optical power of a lens.

Referring now to FIG. 1, an ophthalmic lens 100 with an embedded Variable Optic portion 111 may include an Energy Source 109, such as an electrochemical cell or battery as the storage means for the energy and in some embodiments, encapsulation and isolation of the materials comprising the Energy Source from an environment into which an ophthalmic lens is placed. The Energy Source 109 can provide power to activate the variable optic portion.

A diagram of an exemplary mold 100 for an ophthalmic lens is illustrated with a Variable Optic portion 111. A mold includes a form 100 having a cavity 105 into which a lens forming mixture can be dispensed such that upon reaction or cure of the lens forming mixture, an ophthalmic lens of a desired shape is produced. The molds and mold assemblies 100 of this invention are made up of more than one "mold parts" or "mold pieces" 101-102. The mold parts 101-102 can be brought together such that a cavity 105 is formed between the mold parts 101-102 in which a lens can be formed. This combination of mold parts 101-102 is preferably temporary. Upon formation of the lens, the mold parts 101-102 can again be separated for removal of the lens.

At least one mold part 101-102 has at least a portion of its surface 103-104 in contact with the lens forming mixture such that upon reaction or cure of the lens forming mixture that surface 103-104 provides a desired shape and form to the portion of the lens with which it is in contact. The same is true of at least one other mold part 101-102.

Thus, for example, in a preferred embodiment a mold assembly 100 is formed from two parts 101-102, a female concave piece (front piece) 102 and a male convex piece (back piece) 101 with a cavity formed between them. The portion of the concave surface 104 which makes contact with lens forming mixture has the curvature of the front curve of an ophthalmic lens to be produced in the mold assembly 100 and is sufficiently smooth and formed such that the surface of an ophthalmic lens formed by polymerization of the lens forming mixture which is in contact with the concave surface 104 is optically acceptable.

In some embodiments, the front mold piece 102 can also have an annular flange integral with and surrounding circular circumferential edge and extends from it in a plane normal to the axis and extending from the flange (not shown).

A lens forming surface can include a surface 103-104 with an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface any desired optical characteristics, including without limitation, spherical, aspherical and cylinder power, wave front aberration correction, corneal topography correction and the like as well as any combinations thereof. According to the present invention, optical characteristics can work in concert with a Variable Optic portion 111 to provide an overall optical quality.

A variable optic portion can provide a change in optical characteristic of a lens. In some embodiments, the change in optical characteristic is accomplished by altering the shape of an interface between hydrophilic liquid and hydrophobic liquid. Some embodiments can also include moving a liquid within the lens to change the optical qualities of the lens. By way of non-limiting examples, in some embodiments, it is preferred that the optical power of a Variable Optic portion 111 be capable of changing between 0.1 and 25 diopters. Other embodiments may include less optical power change, such as for example, in order to obtain a thinner Variable Optic Portion 111. Some preferred embodiments therefore include a Variable Optic portion 111 capable of between 1 and 4 diopters of change in optical power.

A Variable Optic portion 111 can include, by way of non-limiting example electrowetting on dielectric ("EWOD"), the EWOD can include thick film, such as between 10 to 30 microns or thin film, such as between 10 to 30 nanometers.

Thick film may also be referred to electrowetting on nanoscaled dielectric ("EWOND").

A variable focal length lens can include, for example, two transparent borders 112A and 112B generally parallel to one another and delimiting, at least in part, an internal volume containing two non-miscible liquids having different optical indices. An elastic element is positioned such that it will deform in response to a change in pressure of the liquids. In some embodiments, the pressure of the liquids can be changed in response to an electrical charge placed across one or both of the liquids.

In some embodiments a variable lens can include a liquid meniscus lens including a liquid containing cell for retaining a volume of two ore more liquids. A lower surface, which is non-planar, includes a conical or cylindrical depression or recess, of axis delta, which contains a drop of an insulating liquid. A remainder of the cell includes an electrically conductive liquid, non-miscible with the insulating liquid, having a different refractive index and, in some embodiments a similar or same density. An annular electrode, which is open facing a recess, is positioned on the rear face of a lower plate. Another electrode is placed in contact with the conductive liquid. Application of a voltage across the electrodes is utilized to create electrowetting and modify the curvature of the interface between the two liquids, according to the voltage applied between the electrodes. A beam of light passing through the cell normal to the upper plate and the lower plate and in the region of the drop will be focused to a greater or lesser extent according to the voltage applied to the electrodes. The conductive liquid is typically an aqueous liquid, and the insulating liquid is typically an oily liquid.

A user controlled adjustment device can be used to focus the lens. The adjustment device can include, by way of non-limiting example, any electronic device or passive device for increasing or decreasing a voltage output. Some embodiments can also include an automated adjustment device for focusing the lens via an automated apparatus according to a measured parameter or a user input. User input may include, for example a switch controlled by wireless apparatus. Wireless may include one or more of: radio frequency control, magnetic switching and inductance switching.

In some embodiments, a lens with a Variable Optic portion 111 can include an insert placed into a lens wherein the insert may include a rigid center soft skirt design in which a central rigid optical element including the Variable Optic portion 111 is in direct contact with the atmosphere and the corneal surface on respective anterior and posterior surfaces, wherein the soft skirt of lens material (typically a hydrogel material) is attached to a periphery of the rigid optical element and the rigid optical element also acts as a Media Insert providing energy and functionality to the resulting ophthalmic lens.

Some additional embodiments include a Variable Optic portion 111 that is a rigid lens or formable lens insert fully encapsulated within a hydrogel matrix. A Variable Optic portion 111 which is a rigid lens insert may be manufactured, for example using microinjection molding technology.

Microinjection molding embodiments can include, for example, a poly(4-methylpent-1-ene copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm and a front surface radius of about 7.9 mm and a rear surface radius of about 7.8 mm and a center thickness of about 0.100 mm and an edge profile of about 0.050 radius.

One exemplary micromolding machine can include the Microsystem 50 five-ton system offered by Battenfield Inc.

The Variable Optic portion 111 insert can be placed in a mold part 101-102 utilized to form an ophthalmic lens. Mold part 101-102 material can include, for example: a polyolefin of one or more of: polypropylene, polystyrene, polyethylene, polymethyl methacrylate, and modified polyolefins. Other molds can include a ceramic or metallic material.

A preferred alicyclic co-polymer contains two different alicyclic polymers. Various grades of alicyclic co-polymer may have glass transition temperatures ranging from 105° C. to 160° C.

In some embodiments, the molds of the invention may contain polymers such as polypropylene, polyethylene, polystyrene, polymethyl methacrylate, modified polyolefins containing an alicyclic moiety in the main chain and cyclic polyolefins. This blend can be used on either or both mold halves, where it is preferred that this blend is used on the back curve and the front curve consists of the alicyclic co-polymers.

In some preferred methods of making molds 100 according to the present invention, injection molding is utilized according to known techniques, however, embodiments can also include molds fashioned by other techniques including, for example: lathing, diamond turning, or laser cutting.

Typically, lenses are formed on at least one surface of both mold parts 101-102. However, in some embodiments, one surface of a lens may be formed from a mold part 101-102 and another surface of a lens can be formed using a lathing method, or other methods.

Lenses

Figure 2:
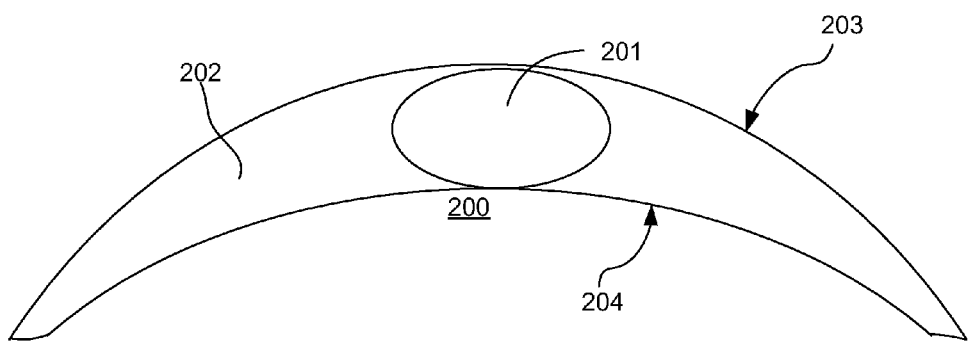
FIG. 2 illustrates aspects of an ophthalmic lens with a variable optic portion.

Referring now to FIG. 2 elements of a variable optic lens portion 200 are illustrated. A first transparent border 203 and a second transparent border 204 are placed with an internal liquid including a first liquid 201 and a second liquid 202. The first liquid and the second liquid are generally non-miscible liquids having different optical indices. Application of an electrical charge will change the interface between the first liquid and the second liquid.

Figure 8:
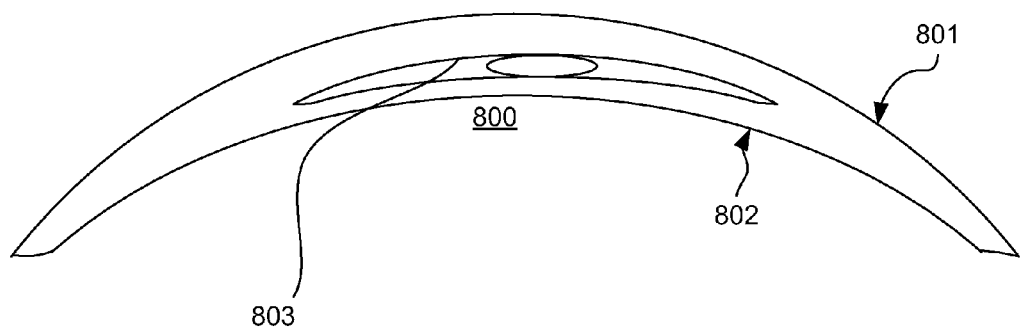
FIG. 8 illustrates a cross section of an exemplary lens with an insert and a variable optic component.

Referring now to FIG. 8 an ophthalmic lens 800 is illustrated with an anterior surface 801 and a posterior surface 802 and an insert with a variable optic portion 803.

Figure 7:
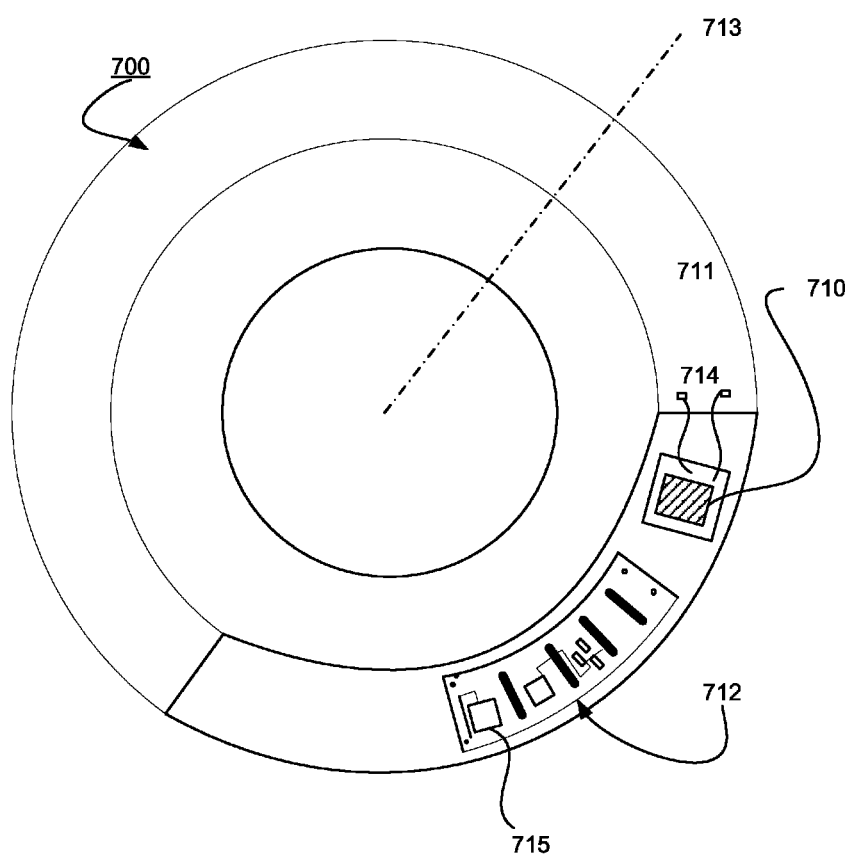
FIG. 7 illustrates a depiction of an exemplary lens with an insert and a variable optic component.

Referring to FIG. 7, a top down depiction of an exemplary embodiment of a variable optic insert 700 is shown. In this depiction, an Energy Source 710 is shown in a periphery portion 711 of the Variable optic insert 700. The Energy Source 710 may include, for example, a thin film, rechargeable lithium ion battery. The Energy Source 710 may be connected to contact points 714 to allow for interconnection. Wires may be wire bond wires and the wire bond wires may connect the contact points 714 to the Energy Source 710 and a photoelectric cell 715, which may be used to reenergize the Energy Source 710. Additional wires may connect the Energy Source 710 to a flexible circuit interconnect via wire bonded contact.

In some embodiments, the Variable optic insert 700 may include a flexible substrate. This flexible substrate may be formed into a shape approximating a typical lens form in a similar manner previously discussed. However to add additional flexibility, the Variable optic insert 700 may include additional shape features such as radial cuts along its length. Various electronic components 712 such as integrated circuits, discrete components, passive components and such devices may also be included.

A variable optic zone 713 is also illustrated. The optic zone may be may be varied on command through the application of a current through the variable optic portion.

In some embodiments, a preferred lens material includes a silicone containing component. A "silicone-containing component" is one that contains at least one [—Si—O—] unit in a monomer, macromer or prepolymer. Preferably, the total Si and attached O are present in the silicone-containing component in an amount greater than about 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, vinyl, N-vinyl lactam, N-vinylamide, and styryl functional groups.

Suitable silicone containing components include compounds of Formula I

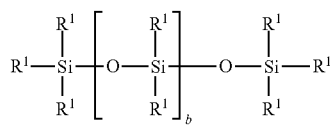

where $R^1$ is independently selected from monovalent reactive groups, monovalent alkyl groups, or monovalent aryl groups, any of the foregoing which may further comprise functionality selected from hydroxy, amino, oxa, carboxy, alkyl carboxy, alkoxy, amido, carbamate, carbonate, halogen or combinations thereof; and monovalent siloxane chains comprising 1-100 Si—O repeat units which may further comprise functionality selected from alkyl, hydroxy, amino, oxa, carboxy, alkyl carboxy, alkoxy, amido, carbamate, halogen or combinations thereof;

where b=0 to 500, where it is understood that when b is other than 0, b is a distribution having a mode equal to a stated value;

wherein at least one $R^1$ comprises a monovalent reactive group, and in some embodiments between one and 3 $R^1$ comprise monovalent reactive groups.

As used herein "monovalent reactive groups" are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl $C_{1-6}$alkyls, O-vinylcarbamates and O-vinylcarbonates. Non-limiting examples of cationic reactive groups include vinyl ethers or epoxide groups and mixtures thereof. In one embodiment the free radical reactive groups comprises (meth)acrylate, acryloxy, (meth)acrylamide, and mixtures thereof.

Suitable monovalent alkyl and aryl groups include unsubstituted monovalent $C_1$ to $C_{16}$alkyl groups, $C_6$-$C_{14}$ aryl groups, such as substituted and unsubstituted methyl, ethyl, propyl, butyl, 2-hydroxypropyl, propoxypropyl, polyethyleneoxypropyl, combinations thereof and the like.

In one embodiment b is zero, one $R^1$ is a monovalent reactive group, and at least 3 $R^1$ are selected from monovalent alkyl groups having one to 16 carbon atoms, and in another embodiment from monovalent alkyl groups having one to 6 carbon atoms. Non-limiting examples of silicone components of this embodiment include 2-methyl-,2-hydroxy-3-[3-[1,3,3,3-tetramethyl-1-[(trimethylsilyl)oxy]disiloxanyl]propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane and 3-methacryloxypropylpentamethyl disiloxane.

In another embodiment, b is 2 to 20, 3 to 15 or in some embodiments 3 to 10; at least one terminal $R^1$ comprises a monovalent reactive group and the remaining $R^1$ are selected from monovalent alkyl groups having 1 to 16 carbon atoms, and in another embodiment from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms and the remaining $R^1$ comprise monovalent alkyl group having 1 to 3 carbon atoms. Non-limiting examples of silicone components of this embodiment include (mono-(2-hydroxy-3-methacryloxypropyl)-propyl ether terminated polydimethylsiloxane (400-1000 MW)) ("OH-mPDMS"), monomethacryloxypropyl terminated mono-n-butyl terminated polydimethylsiloxanes (800-1000 MW), ("mPDMS").

In another embodiment b is 5 to 400 or from 10 to 300, both terminal $R^1$ comprise monovalent reactive groups and the remaining $R^1$ are independently selected from monovalent alkyl groups having 1 to 18 carbon atoms which may have ether linkages between carbon atoms and may further comprise halogen.

In one embodiment, where a silicone hydrogel lens is desired, the lens of the present invention will be made from a reactive mixture comprising at least about 20 and preferably between about 20 and 70% wt silicone containing components based on total weight of reactive monomer components from which the polymer is made.

In another embodiment, one to four $R^1$ comprises a vinyl carbonate or carbamate of the formula:

Formula II

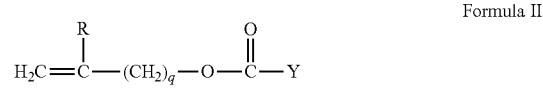

wherein: Y denotes O—, S— or NH—;
R denotes, hydrogen or methyl; d is 1, 2, 3 or 4; and q is 0 or 1.

The silicone-containing vinyl carbonate or vinyl carbamate monomers specifically include: 1,3-bis[4-(vinyloxycarbonyloxy)but-1-yl]tetramethyl-disiloxane; 3-(vinyloxycarbonylthio)propyl-[tris(trimethylsiloxy)silane]; 3-[tris(trimethylsiloxy)silyl]propyl allyl carbamate; 3-[tris(trimethylsiloxy)silyl]propyl vinyl carbamate; trimethylsilylethyl vinyl carbonate; trimethylsilylmethyl vinyl carbonate, and

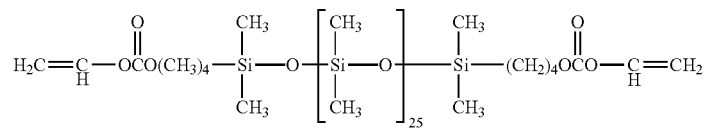

Where biomedical devices with modulus below about 200 are desired, only one $R^1$ shall comprise a monovalent reactive group and no more than two of the remaining $R^1$ groups will comprise monovalent siloxane groups.

Another class of silicone-containing components includes polyurethane macromers of the following formulae:

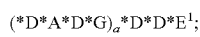

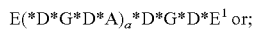

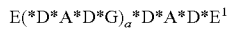             Formulae IV-VI wherein:

D denotes an alkyl diradical, an alkyl cycloalkyl diradical, a cycloalkyl diradical, an aryl diradical or an alkylaryl diradical having 6 to 30 carbon atoms, G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1;

A denotes a divalent polymeric radical of formula:

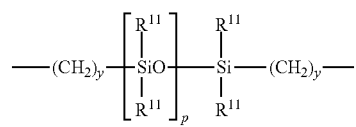             Formula VII $R^{11}$ independently denotes an alkyl or fluoro-substituted alkyl group having 1 to 10 carbon atoms which may contain ether linkages between carbon atoms; y is at least 1; and p provides a moiety weight of 400 to 10,000; each of E and $E^1$ independently denotes a polymerizable unsaturated organic radical represented by formula:

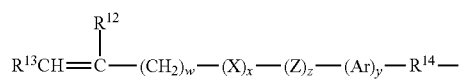             Formula VIII wherein: $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing component is a polyurethane macromer represented by the following formula:

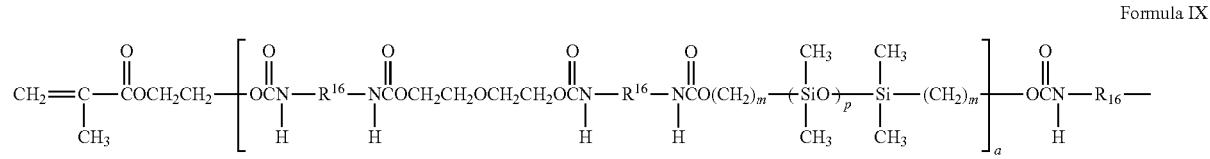             Formula IX

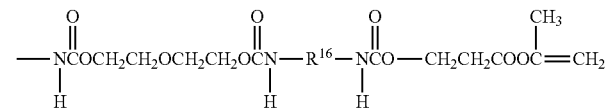

wherein $R^{16}$ is a diradical of a diisocyanate after removal of the isocyanate group, such as the diradical of isophorone diisocyanate. Another suitable silicone containing macromer is compound of formula X (in which x+y is a number in the range of 10 to 30) formed by the reaction of fluoroether, hydroxy-terminated polydimethylsiloxane, isophorone diisocyanate and isocyanatoethylmethacrylate.

Formula X

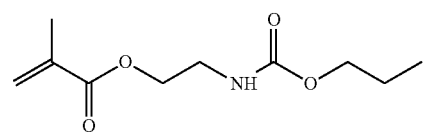

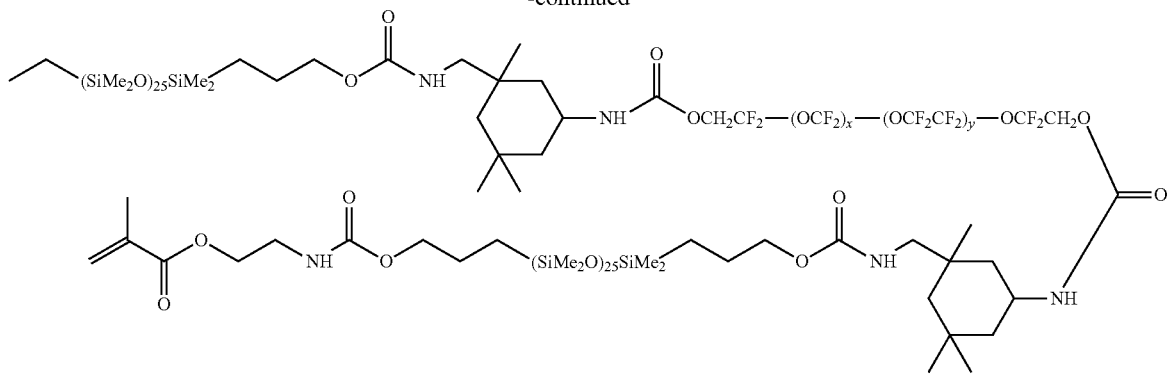

Other silicone containing components suitable for use in this invention include macromers containing polysiloxane, polyalkylene ether, diisocyanate, polyfluorinated hydrocarbon, polyfluorinated ether and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkanges and crosslinkable monomers containing polyether and polysiloxanyl groups. Any of the foregoing polysiloxanes can also be used as the silicone containing component in this invention.

Processes

The following method steps are provided as examples of processes that may be implemented according to some aspects of the present invention. It should be understood that the order in which the method steps are presented is not meant to be limiting and other orders may be used to implement the invention. In addition, not all of the steps are required to implement the present invention and additional steps may be included in various embodiments of the present invention.

Figure 4:
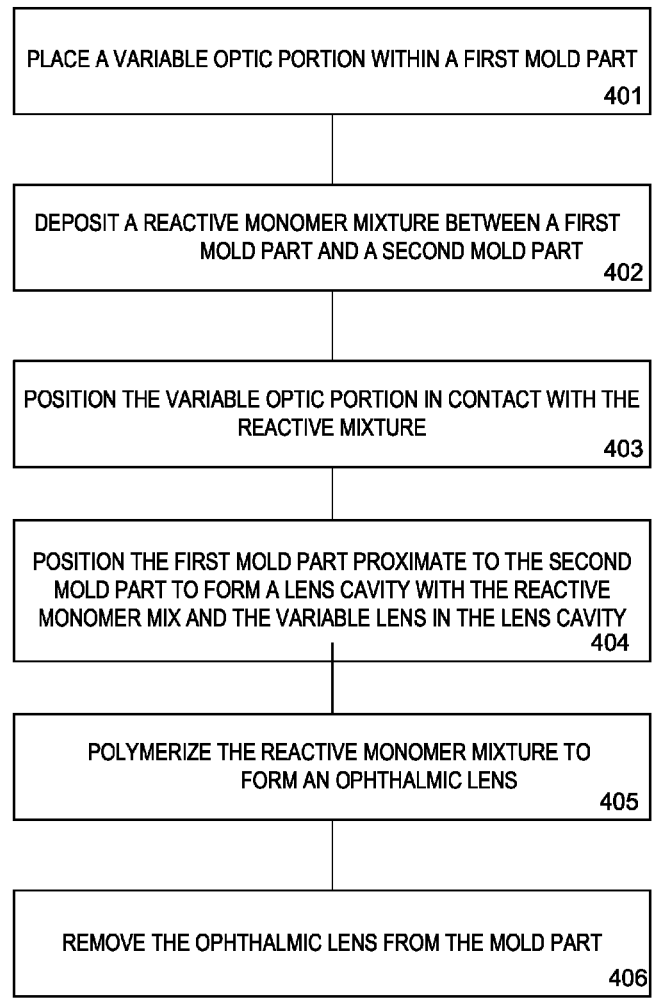
FIG. 4 illustrates method steps according to some embodiments of the present invention.

Referring now to FIG. 4, a flowchart illustrates exemplary steps that may be used to implement the present invention. At 401, a Variable Optic portion is placed within a mold part. The Variable Optic portion may or may not also contain one or more components.

In some preferred embodiments, the Variable Optic portion is placed in the mold part via mechanical placement. Mechanical placement can include, for example, a robot or other automation, such as those known in the industry to place surface mount components. Human placement of a Variable Optic portion is also within the scope of the present invention. Accordingly, any mechanical placement or automation may be utilized which is effective to place a Variable Optic portion with an Energy Source within a cast mold part such that the polymerization of a Reactive Mixture contained by the mold part will include the variable optic in a resultant ophthalmic lens.

In some embodiments, a Variable Optic portion is placed in a mold part attached to a substrate. An Energy Source and one or more components are also attached to the substrate and are in electrical communication with the Variable Optic portion. Components may include for example, circuitry to control power applied to the Variable Optic portion. Accordingly, in some embodiments a component includes control mechanism for actuating the Variable Optic portion to change one or more optical characteristics, such as, for example, a change of state between a first optical power and a second optical power.

In some embodiments, a processor device, MEMS, NEMS or other component may also be placed into the Variable Optic portion and in electrical contact with the Energy Source. The substrate may contain one or both of flexible and rigid materials.

At 402, a reactive monomer mix can be deposited into a mold part.

At 403, the Variable Optic is positioned in contact with the reactive mixture within the first mold part.

At 404, the first mold part is placed proximate to a second mold part to form a lens forming cavity with at least some of the reactive monomer mix and the Variable Optic portion in the cavity. As discussed above, preferred embodiments include an Energy Source and one or more components also within the cavity and in electrical communication with the Variable Optic portion.

At 405, the reactive monomer mixture within the cavity is polymerized. Polymerization can be accomplished, for example, via exposure to one or both of actinic radiation and heat. At 406, the ophthalmic lens is removed from the mold parts with the Variable Optic portion adhered to or encapsulated within the polymerized material making up the ophthalmic lens.

Although invention may be used to provide hard or soft contact lenses made of any known lens material, or material suitable for manufacturing such lenses, preferably, the lenses of the invention are soft contact lenses having water contents of about 0 to about 90 percent. More preferably, the lenses are made of monomers containing hydroxy groups, carboxyl groups, or both or be made from silicone-containing polymers, such as siloxanes, hydrogels, silicone hydrogels, and combinations thereof. Material useful for forming the lenses of the invention may be made by reacting blends of macromers, monomers, and combinations thereof along with additives such as polymerization initiators. Suitable materials include, without limitation, silicone hydrogels made from silicone macromers and hydrophilic monomers.

Figure 5:
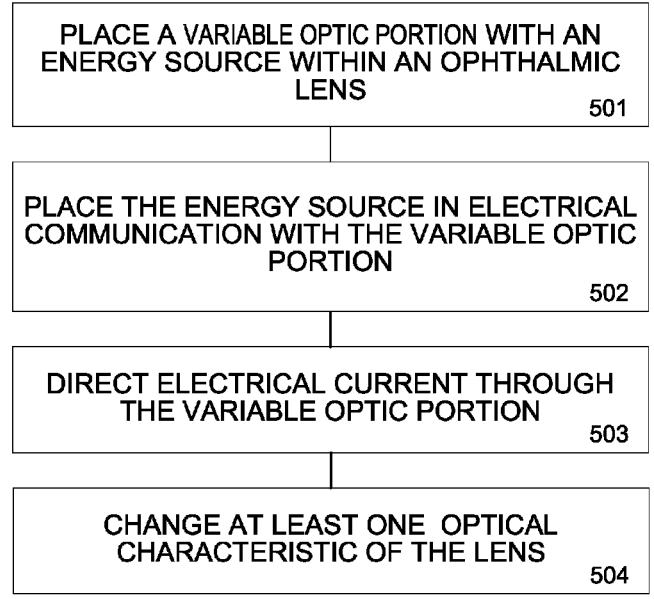
FIG. 5 illustrates method steps according to some additional aspect of the present invention.

Referring now to FIG. 5, at 501, a Variable Optic portion is placed within an ophthalmic lens, as discussed above. At 502, the Variable Optic portion is placed in electrical communication with an Energy Source. Electrical communication can be accomplished, for example, via circuitry incorporated into the variable optic portion or via pathways ink jetted or otherwise formed directly upon lens material.

At 503, electrical energy is directed through the variable optic portion incorporated into the ophthalmic lens. The energy can be directed, for example, via electrical circuitry capable of conducting the electrical charge. At 504 the variable optic changes at least one optical quality of the lens.

Apparatus

Figure 3:
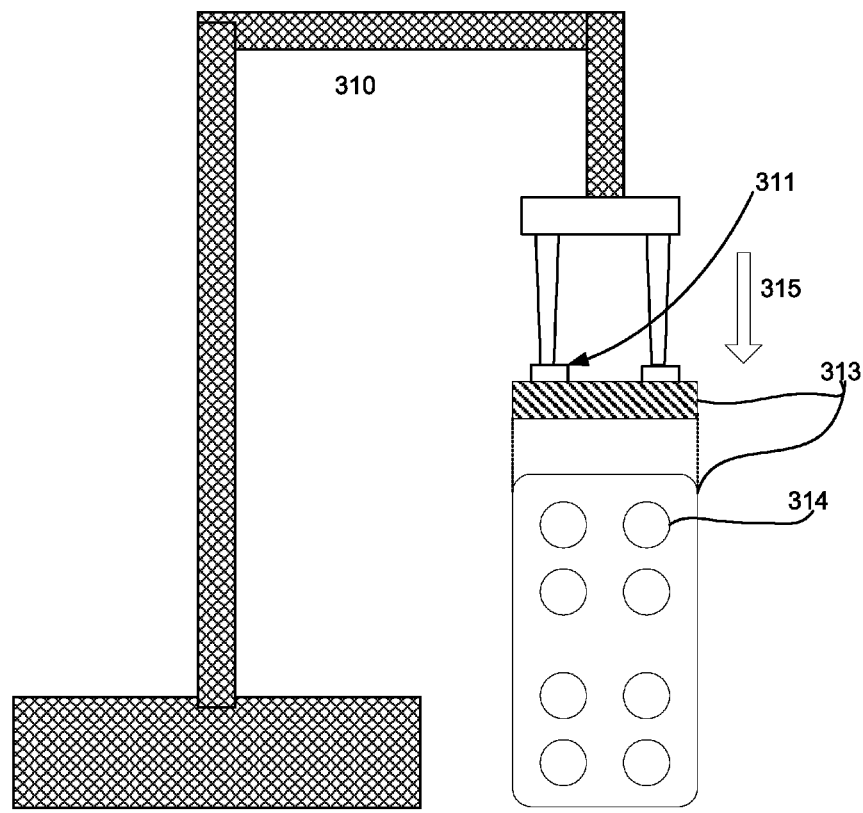
FIG. 3 illustrates an apparatus for placing variable optic portion within an ophthalmic lens mold part.

Referring now to FIG. 3, automated apparatus 310 is illustrated with one or more transfer interfaces 311. Multiple mold parts, each with an associated Variable Optic insert 314 are contained on a pallet 313 and presented to transfer interfaces 311. Embodiments, can include, for example a single interface individually placing Variable Optic insert 314, or multiple interfaces (not shown) simultaneously placing Variable Optic inserts 314 into the multiple mold parts, and in some embodiments, in each mold part. Placement may occur via vertical movement 315 of the transfer interfaces 311.

Another aspect of some embodiments of the present invention, includes apparatus to support the Variable Optic insert 314 while the body of the ophthalmic lens is molded around these components. In some embodiments the Variable Optic insert 314 and an Energy Source may affixed to holding points in a lens mold (not illustrated). The holding points may be affixed with polymerized material of the same type that will be formed into the lens body. Other embodiments include a layer of prepolymer within the mold part onto which the Variable Optic insert 314 and an Energy Source may affixed.

Figure 6:
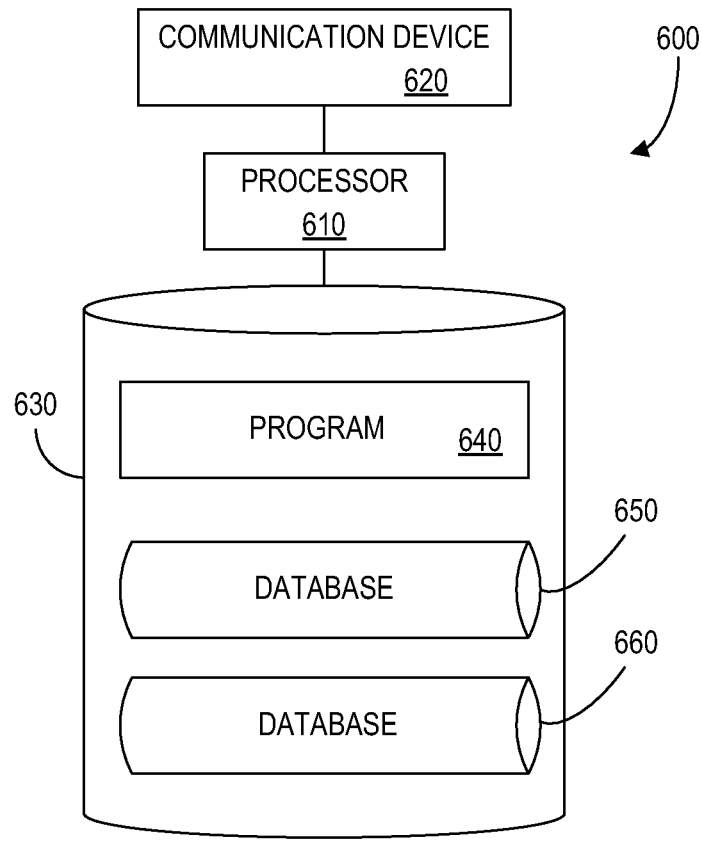
FIG. 6 illustrates a processor that may be used to implement some embodiments of the present invention.

Referring now to FIG. 6 a controller 600 is illustrated that may be used in some embodiments of the present invention. The controller 600 includes a processor 610, which may include one or more processor components coupled to a communication device 620. In some embodiments, a controller 600 can be used to transmit energy to the Energy Source placed in the ophthalmic lens.

The controller can include one or more processors, coupled to a communication device configured to communicate energy via a communication channel. The communication device may be used to electronically control one or more of: the placement of an variable optic insert into the ophthalmic lens and the transfer of a command to operate a Variable Optic device.

The communication device 620 may also be used to communicate, for example, with one or more controller apparatus or manufacturing equipment components.

The processor 610 is also in communication with a storage device 630. The storage device 630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 630 can store a program 640 for controlling the processor 610. The processor 610 performs instructions of the program 640, and thereby operates in accordance with the present invention. For example, the processor 610 may receive information descriptive of variable optic insert placement, processing device placement, and the like. The storage device 630 can also store ophthalmic related data in one or more databases 650, 660. The database 650,660 may include specific control logic for controlling energy to and from a Variable Optic lens.

CONCLUSION

The present invention, as described above and as further defined by the claims below, provides methods of providing an ophthalmic lens with a variable optic portion. The variable optic portion can include for example a liquid meniscus lens.

The invention claimed is:

1. A system for forming a biocompatible ophthalmic lens device with a variable optic insert, the system comprising:
    a variable optic insert capable of changing an optical characteristic of the biocompatible ophthalmic lens device;
    a first mold part;
    an energy source;
    a second mold part;
    a reactive monomer mix; and
    an apparatus comprising a controller in communication with a storage media, said storage media storing executable software, wherein said executable software is operative with the controller to cause automation to:
    place the variable optic insert proximate to the first mold part;
    place the energy source proximate to the first mold part and in electrical communication with the variable optic insert;
    deposit the reactive monomer mix into the first mold part;
    position the variable optic insert and the energy source in contact with the reactive monomer mix;
    position the first mold part proximate to the second mold part thereby forming a lens cavity with the variable optic insert, the energy source and the reactive monomer mix in the lens cavity; and
    expose the reactive monomer mix to actinic radiation.

2. The system of claim 1, wherein the variable optic insert comprises a thin film electrowetting lens.

3. The system of claim 1, wherein the variable optic insert comprises a thick film electrowetting lens.

4. The system of claim 1, wherein the variable optic insert comprises a rigid insert.

5. The system of claim 1, wherein the variable optic insert comprises multiple disparate portions, each disparate portion sealed from another portion.

6. The system of claim 4, wherein the energy source comprises a thin film electrochemical cell capable of providing sufficient energy to change an optical characteristic of the biocompatible ophthalmic lens device, and wherein the thin film electrochemical cell is supported by the rigid insert.

7. The system of claim 6, wherein the thin film electrochemical cell comprises a lithium ion battery.

8. The system of claim 6, wherein the thin film electrochemical cell comprises a rechargeable material.

9. The system of claim 1, wherein the variable optic insert comprises a formable substrate.

10. The system of claim 1, wherein the apparatus is capable of interfacing with a pallet comprising a plurality of first mold parts.

11. The system of claim 10, wherein the apparatus interfaces individually with the first mold parts.

12. The system of claim 10, wherein the apparatus interfaces simultaneously with the first mold parts.

13. The system of claim 1, wherein the variable optic insert comprises a liquid meniscus operable to change the optical characteristic of the biocompatible ophthalmic lens device.

14. The system of claim 2, wherein the thin film electrowetting lens is 10 to 30 nanometers.

15. The system of claim 3, wherein the thick film electrowetting lens is 10 to 30 microns.

* * * * *